US011291173B2

(12) United States Patent
Janssen

(10) Patent No.: US 11,291,173 B2
(45) Date of Patent: Apr. 5, 2022

(54) GROWTH DEVICE FOR CROP, USE OF SUCH A DEVICE, AND A SERIES OF GROWTH DEVICES

(71) Applicants: HEVORMA B.V., Malden (NL); DARTDIJK N.V., Leesum (NL)

(72) Inventor: Hendrikus Wilhelmus Theodorus Janssen, Malden (NL)

(73) Assignees: HEVORMA B.V., Malden (NL); DARTDIJK N.V., Leesum (NL)

(*) Notice: Subject to any disclaimer, the term of this patent is extended or adjusted under 35 U.S.C. 154(b) by 558 days.

(21) Appl. No.: 16/149,501

(22) Filed: Oct. 2, 2018

(65) Prior Publication Data

US 2019/0029194 A1 Jan. 31, 2019

Related U.S. Application Data

(63) Continuation of application No. 14/442,455, filed as application No. PCT/NL2013/050816 on Nov. 13, 2013, now Pat. No. 10,123,494.

(30) Foreign Application Priority Data

Nov. 13, 2012 (NL) ...................................... 2009794

(51) Int. Cl.
*A01G 31/00* (2018.01)
*A01G 9/02* (2018.01)
(Continued)

(52) U.S. Cl.
CPC ............. *A01G 27/02* (2013.01); *A01G 9/025* (2013.01); *A01G 27/003* (2013.01); *A01G 31/02* (2013.01); *B01F 3/04099* (2013.01); *Y02P 60/20* (2015.11)

(58) Field of Classification Search
CPC ........ A01G 27/02; A01G 9/025; A01G 31/02; A01G 27/003; A01G 9/022; A01G 27/005;
(Continued)

(56) References Cited

U.S. PATENT DOCUMENTS 6,219,969 B1 4/2001 Dion
9,462,755 B1 10/2016 Coraggio
(Continued)

FOREIGN PATENT DOCUMENTS

CA 2 568 493 A1 2/2008
CN 1860845 A 11/2006
(Continued)

OTHER PUBLICATIONS

International Search Report, dated Feb. 24, 2014, issued in International Application No. PCT/NL2013/050816.

*Primary Examiner* — Trinh T Nguyen
(74) *Attorney, Agent, or Firm* — Saul Ewing Arnstein & Lehr LLP

(57) ABSTRACT

Growth device for crop, comprising a panel-shaped structure, a substrate included in the panel-shaped structure for receiving crop, at least one water reservoir included in the panel-shaped structure, connecting means to bring the water reservoir in communication with the substrate for moistening the substrate, wherein the water reservoir extends substantially above a bottom side of the substrate in a vertical position of use of the growth device.

21 Claims, 13 Drawing Sheets

(51) Int. Cl.
  *A01G 27/02* (2006.01)
  *A01G 27/00* (2006.01)
  *A01G 31/02* (2006.01)
  *B01F 3/04* (2006.01)

(58) Field of Classification Search
  CPC .......... A01G 9/02; A01G 9/023; A01G 27/04;
  A01G 27/06; A01G 27/006; A01G 31/06;
  A01G 27/008
  See application file for complete search history.

(56) References Cited

U.S. PATENT DOCUMENTS

| | | |
|---|---|---|
| 2007/0199241 A1 | 8/2007 | Peleszezak |
| 2008/0110086 A1 | 5/2008 | Julia |
| 2008/0295402 A1 | 12/2008 | Bindschedler |
| 2008/0302009 A1* | 12/2008 | Frecon .................. A01G 9/022 47/83 |
| 2009/0223126 A1 | 9/2009 | Garner |
| 2010/0313473 A1 | 12/2010 | Cussol et al. |
| 2011/0094153 A1* | 4/2011 | Urriola .................. A01G 9/025 47/65.7 |
| 2011/0107667 A1 | 5/2011 | Laurence |
| 2011/0146151 A1 | 6/2011 | Janssen |
| 2012/0222352 A1 | 9/2012 | Janssen |
| 2013/0160363 A1 | 6/2013 | Whitney |
| 2014/0318011 A1 | 10/2014 | Jarvinen |
| 2015/0289452 A1 | 10/2015 | Axley |

FOREIGN PATENT DOCUMENTS

| | | |
|---|---|---|
| CN | 101553108 A | 10/2009 |
| CN | 201409341 Y | 2/2010 |
| CN | 101711497 A | 5/2010 |
| CN | 201667856 U | 12/2010 |
| CN | 201709178 U | 1/2011 |
| CN | 102007859 A | 4/2011 |
| CN | 102511360 A | 6/2012 |
| CN | 102550325 A | 7/2012 |
| CN | 202310793 U | 7/2012 |
| CN | 102677960 A | 9/2012 |
| CN | 102762093 A | 10/2012 |
| CN | 102763574 A | 11/2012 |
| CN | 202444860 U | 9/2015 |
| DE | 20 2009 07 280 U1 | 9/2009 |
| EP | 2 359 680 A1 | 8/2011 |
| FR | 1503197 | 11/1967 |
| FR | 2601552 A1 | 1/1988 |
| FR | 2849987 A1 | 7/2004 |
| FR | 2902902 A1 | 12/2007 |
| FR | 2967550 A1 | 5/2012 |
| GB | 2 430 856 A | 4/2007 |
| JP | H0847345 A | 2/1996 |
| JP | 2004-350528 A | 12/2004 |
| JP | 2006 280285 A | 10/2006 |
| JP | 2011-62187 A | 3/2011 |
| WO | 2006/128414 A2 | 12/2006 |
| WO | 2007/009198 A1 | 1/2007 |
| WO | 2011/025364 A1 | 3/2011 |
| WO | 2012/050499 A1 | 4/2012 |
| WO | 2012/065212 A1 | 5/2012 |

\* cited by examiner

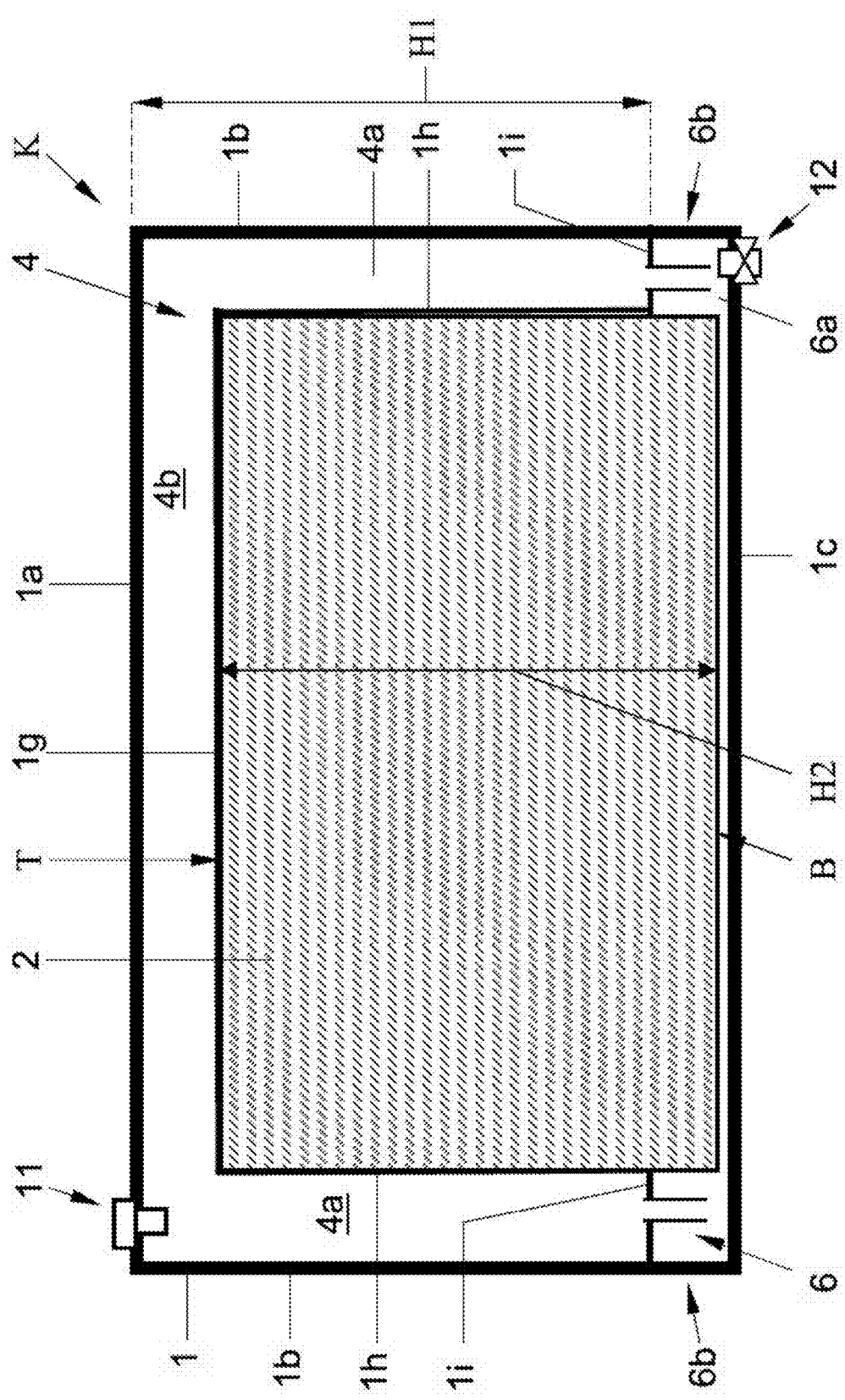

GROWTH DEVICE FOR CROP, USE OF SUCH A DEVICE, AND A SERIES OF GROWTH DEVICES

CROSS REFERENCE TO RELATED APPLICATIONS

This application is a continuation of U.S. application Ser. No. 14/442,455, filed May 13, 2015, which claims the priority of PCT/NL2013/050816, filed on Nov. 13, 2013, which claims priority to NL Application No. 2009794, filed on Nov. 13, 2012, the entire contents of each of which are incorporated fully herein by reference.

BACKGROUND OF THE INVENTION

The invention relates to a growth device for crop, comprising a panel-shaped structure, a substrate included in the panel-shaped structure for receiving crop, at least, a part of the crop, in particular at least a crop root part.

Such a device is known per se from the state of the art. For instance, the Japanese document JP2006280285 describes a suspendible plantable panel provided with plantable mats, with a water drip tube adjacent a top, and a water catch reservoir at the bottom. From the reservoir, water can be sucked upwards by means of a capillary plate, for distribution in the adjacent plantable mats, in particular via a glass fiber water supply mat. As follows from the drawing of the document, the panel is provided, adjacent a top, with a water drip tube.

SUMMARY OF THE INVENTION

The present invention contemplates the provision of an improved growth device for crop. In particular, the invention contemplates the provision of a growth device that is autonomously deployable, and, in particular, can provide the plants with sufficient water for a relatively long time, while the device can preferably present a vertical or inclined grown surface.

According to an aspect of the present invention, to that end, a growth device is characterized by the features of claim 1.

In particular, the growth device for crop comprises a panel-shaped structure, a substrate included in the panel-shaped structure for receiving crop, at least one water reservoir included in the panel-shaped structure (in particular separated from the substrate), connecting means to bring the water reservoir into communication with the substrate for moistening the substrate, wherein the water reservoir extends substantially above a bottom side of the substrate in a vertical position of use of the growth device.

In this manner, the growth device can contain a relatively large, in particular relatively voluminous, water reservoir, to be able to hold a relatively large quantity of water. Thus, sufficient water is available to moisten plants during use for a relatively long period of time. In particular, the invention can thus offer a device formed as a "plantscape", or a "plant cassette".

The connecting means can be designed in different manners, and are designed in particular to establish a water supplying connection between a content of the reservoir on the one hand and the substrate on the other hand (for the purpose of water transmission to the substrate).

According to a further elaboration, the connecting means can comprise a bottom reservoir extending substantially under the substrate. The connecting means can, for instance, be provided with valve means for regulating water flow.

Further, the panel-shaped structure may be implemented in different manners, and, for instance, be provided with a framework surrounding the substrate and the water reservoir.

The panel-shaped structure is provided, in particular, with supporting means extending behind the substrate, for instance, a rear wall or partitioning wall. In addition, for instance, a covering extending in front of the substrate may be provided, for instance, a front wall which may comprise a number of openings to guide the plants through.

The substrate as such can be designed in different manners. Preferably, the substrate is designed to be panel-shaped, for instance as a single panel or a number of panel parts, as a cassette, as described hereinafter, as a growth mat, or the like.

According to a further elaboration, a height of the water reservoir can, for instance, be equal to half the height of the substrate.

According to an extra advantageous elaboration, the water reservoir extends at least partly or partly above a top of the substrate, in a vertical position of use of the growth device.

In a particularly advantageous embodiment of the growth device according to the invention, the substrate can be designed as a cassette, whereby the cassette is removably included in a receiving opening, or cavity, in the panel-shaped structure. An advantage of such an embodiment of the substrate is that a loose cassette can be simply filled with crops at a particular location. Then, such an already filled cassette can easily be taken to another location where a panel-shaped structure is located and there be inserted into the panel-shaped structure. Also, a cassette can easily be taken out of the panel-shaped structure and another cassette can be inserted into the panel-shaped structure. This can be practical when a user wants to provide the growth device with a different kind of plants.

Such a cassette of the growth device according to an embodiment of the invention preferably comprises a plant receiving part, for instance of a substantially rigid material, a rear part, and between the plant receiving part and the rear part at least one capillary cloth. The cloth preferably extends along substantially the entire rear part, but at least over the surface located opposite the receiving openings for plants in the plant receiving part. The cloth can be clamped against the rear part with the aid of a plant growth layer and/or a strengthening layer provided between the capillary cloth and the plant receiving part. In this manner, the capillary cloth is provided in a tension free manner between the parts, thereby increasing the capillarity in the cloth. In another elaboration, the capillary cloth can also be fixed onto the rear part, for instance by flanging the edges of the rear part and clamping the cloth therebetween. Also, other fastening means may be provided on the rear part to fasten the capillary cloth tension free against the rear part, at least on the side which, in use, faces the plant receiving part. The capillary cloth can comprise a woven or a non-woven cloth with capillary properties. The capillary cloth can for instance be formed from microfiber fabric. When the crops are inserted into the plant receiving part, the roots lie against the capillary cloth. The capillary cloth takes up water from the water reservoir and distributes the water over the cloth so that the roots of the crops are fed. When the cassette is provided with a plant growth layer, this layer can provide the roots with (further) nutrients in that the water finds its way to the roots via the capillary cloth through the plant growth layer. To bring the capillary cloth into communication with the water in the water reservoir, the rear part, according to a further elaboration of the invention, is preferably provided with a substantially elongated opening which extends substantially parallel to a first circumferential side of the rear part, at a short distance from this circumferential side. The capillary cloth extends through the opening and the cloth has dimensions such that the part of the cloth that is inserted through the opening projects beyond the rear part or is folded back over the rear part, on a surface side of the rear part that faces away from the plant receiving part. Depending on the position of the cassette relative to the panel-shaped structure, the cloth extends downwards and hangs in the water reservoir or extends parallel to the rear part and fluid communication is provided for with a capillary rear wall of the receiving opening.

In the latter elaboration, the capillary rear wall preferably extends partly into the water reservoir which is located in the panel-shaped structure above a top side of the cassette. The capillary rear wall takes up water from the top water reservoir and siphons the water downwards. Owing to the fluid contact between the capillary rear wall and the capillary cloth, the water is passed on to the roots of the crops lying against the capillary cloth in the cassette.

In particular, the substrate can be provided with a number of mutually spaced apart openings, each for instance having a width of at least 3 cm, for receiving crop. Such openings may already be provided in the substrate on purchase or delivery of the device, or may subsequently be provided in the substrate by an end user.

The substrate may already be present in the panel-shaped structure upon delivery or purchase, or may be provided in the panel-shaped structure afterwards. The panel-shaped structure can for instance comprise different detachable structural parts, such that the structure can be opened to make internal cavity accessible for placing the substrate in the structure.

The substrate (also called core part) can for instance comprise, at least for the greater part, a growth medium, suitable for growth of plants, or be formed therefrom. In particular, the substrate can be a hydrophilic substrate and, for instance, have capillary properties for the purpose of drawing water from an environment and retaining it.

The substrate can be manufactured, for instance, from rock wool having hydrophilic properties. In another embodiment, the substrate can be manufactured, for instance, from rock wool having water retention properties. In another embodiment, substrate can comprise, for instance, soil, turf, oasis, coconut fiber or another growth medium. Moreover, mixtures of growth media may be provided in a substrate or as substrate.

According to a further elaboration of the growth device according to the invention, the panel-shaped structure can comprise a number of substrates or cassettes which are detachably provided in the structure. The substrates or cassettes can extend next to one another, both in vertical direction and in horizontal direction. In such an elaboration of the invention, it is particularly advantageous to provide the panel-shaped structure with a capillary rear wall and to place each cassette such that the capillary cloth is folded back over a part of the rear part.

Further, an aspect of the invention provides a series, for instance a stack, comprising a number of growth devices according to the invention, whereby the devices, in particular, are stacked onto each other by top and bottom sides, and/or for instance are placed against each other by longitudinal sides. In this manner, a relatively large surface, for instance a vertical or oblique surface, can be provided with plant covering.

Finally, the invention relates to a separate cassette for a growth device, the cassette comprising a plant receiving part, provided with openings for taking up crop and preferably of a substantially rigid material, and a rear part, while between the plant receiving part and the rear part at least one capillary cloth is provided. This cassette provides advantages and effects equal to those already described above for the growth device provided with a cassette. Further, the cassette, owing to the simple construction thereof, can be easily manufactured and easily provided with crops. In addition, the cassette, since only a capillary cloth is needed for watering and feeding the roots of the crops, can be of relatively thin design. This is beneficial to the appearance of the growth device, for instance when it is placed on a wall. Owing to the limited number of parts, the weight of the cassette will be relatively low both with and without crops. As the rear part is provided in a manner linking up with the plant receiving part, for instance by snap-fitting the rear part in a circumferential edge of the plant receiving part, a compact cassette is obtained.

In a further elaboration of the cassette, between the plant receiving part and the capillary cloth a plant growth layer can be provided. The plant growth layer can for instance be a rock wool or another medium for buffering water and/or nutrients. Possibly, also a strengthening layer may be provided which presses the capillary cloth, or the capillary cloth and the plant growth layer, against the rear part.

In a further embodiment of the cassette, the rear part can be provided with an elongated opening near a first circumferential side of the rear part, with the opening running substantially parallel to the circumferential side of the rear part, while the capillary cloth, at least partly, is passed through the opening.

BRIEF DESCRIPTION OF THE DRAWINGS

Further elaborations of the invention are described in the subclaims. The invention will now be further elucidated on the basis of an exemplary embodiment and the drawings. In the drawings:

FIG. 17 shows an alternative flow regulator which includes two aerators, in the form of aerator pipes.

Figure 1:
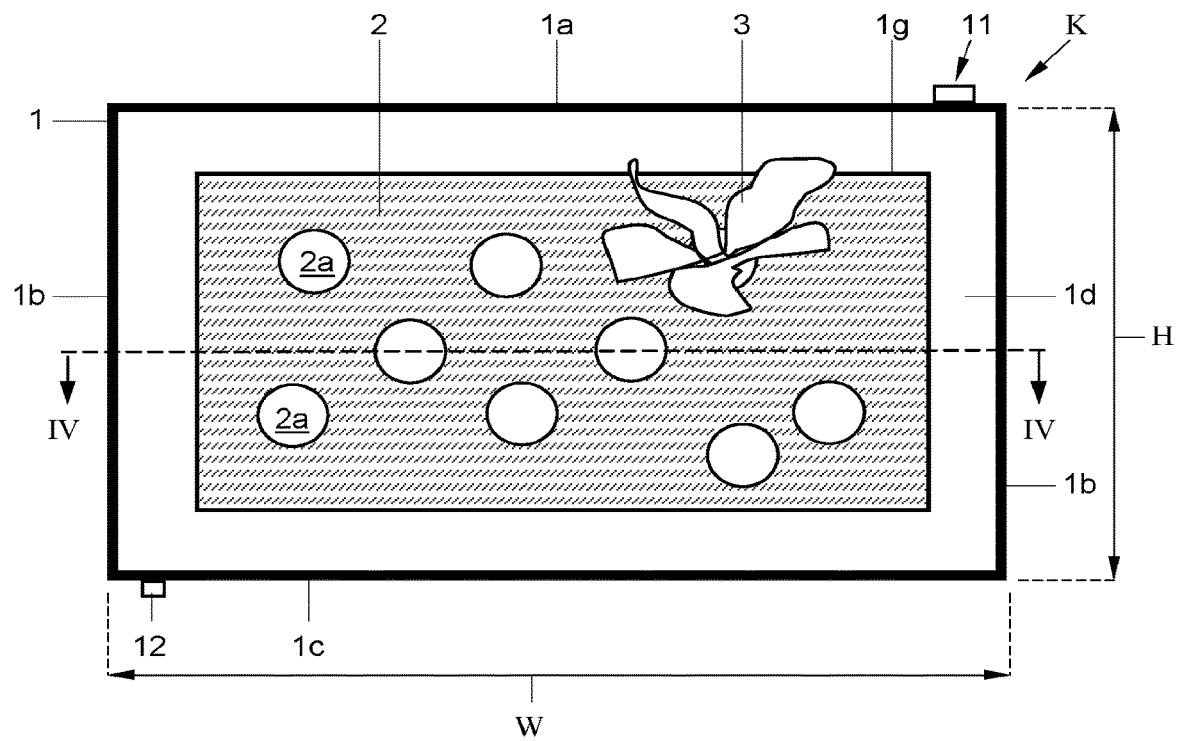
FIG. 1 shows a partly cutaway front view of an exemplary embodiment of the invention, in a vertical position of use.
Figure 2:
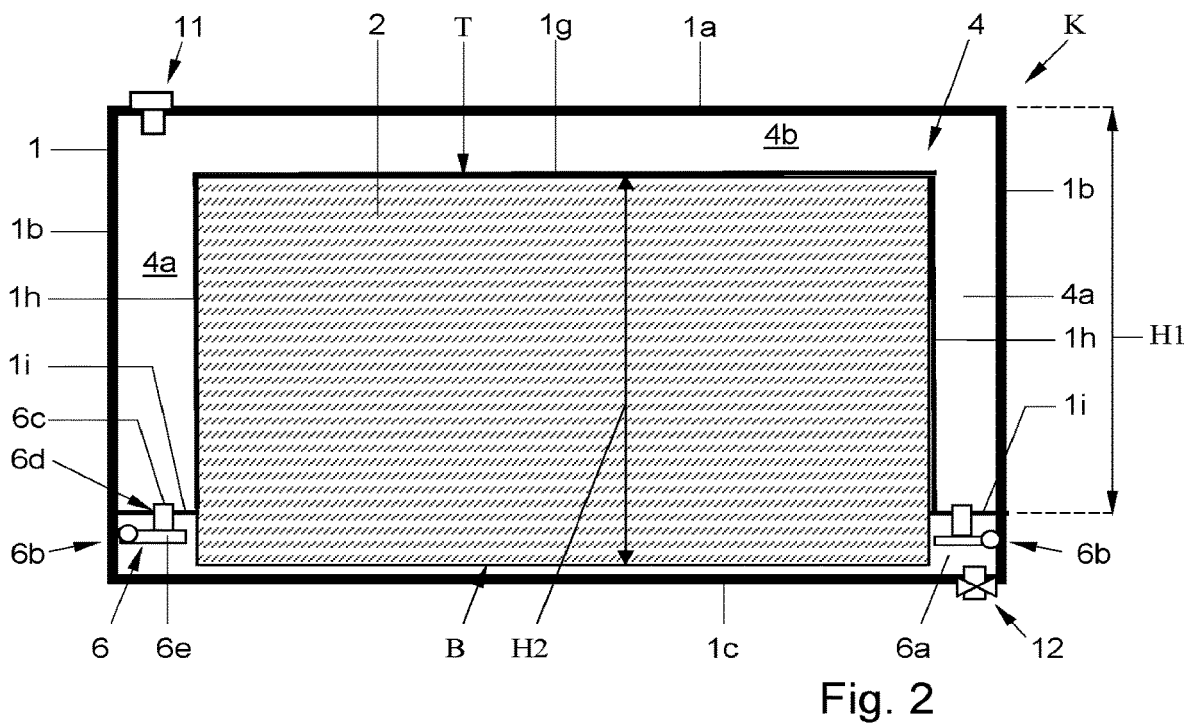
FIG. 2 shows a cutaway rear view of the exemplary embodiment of the invention shown in FIG. 1.
Figure 3:
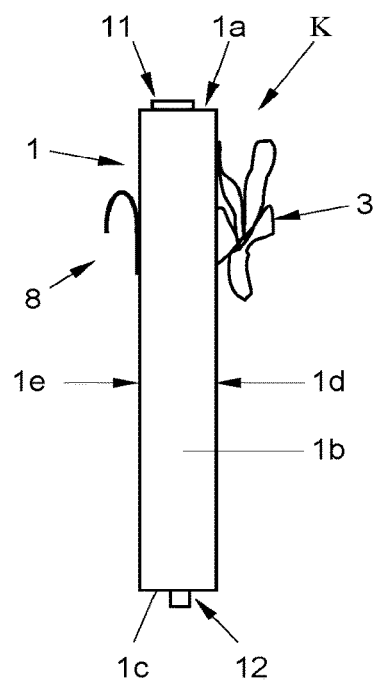
FIG. 3 shows a side view of the example shown in FIG. 1.
Figure 4:
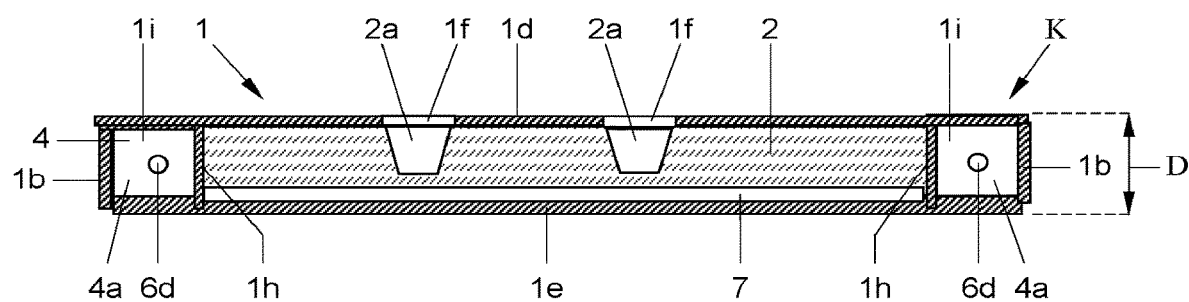
FIG. 4 shows a cross section along the line IV-IV of FIG. 1.

Like or corresponding features are indicated in this application with like or corresponding reference signs.

DETAILED DESCRIPTION OF THE INVENTION

FIGS. 1-4 show a non-limitative example of a growth device K for crop, comprising a panel-shaped structure 1, a substrate 2 included in the panel-shaped structure 1 for receiving crops 3, at least one main water reservoir 4 included in the panel-shaped structure 1, connecting means 6 for bringing the water reservoir into communication with the substrate 2 for moistening the substrate 2. In particular, the panel-shaped structure 1 comprises or defines a cavity in which the substrate 2 is included.

Preferably, the water reservoir 4 extends substantially above a bottom side B of the substrate 2 in a vertical position of use of the growth device K, as in the present exemplary embodiments. In the examples, the main water reservoir 4 is completely separated from the substrate 2. The connecting means can effect a particularly well-controlled water delivery.

The panel-shaped structure 1 as such can be designed in different manners, and comprise diverse shapes, viewed in front view, for instance, polygonal, square, rectangular (as in the present example, with four closed outer walls 1a, 1b, 1c, extending at right angles to each other), circular or rounded, elliptical, or otherwise. The example is of symmetrical design, in particular mirror symmetrical relative to a central, vertical median plane, but this is not requisite.

Preferably, the panel-shaped structure 1 is of relatively slender design, having a thickness D measured between a front and rear side, which is at least a factor five smaller, and preferably at least a factor ten smaller, than a vertical height H and horizontal width W of the structure (measured in a vertical condition of use shown in FIGS. 1-4). The structure 1 can have different dimensions, having for instance an advantageous minimum width W of 20 cm, for instance a width W of at least 30, 50 or 100 cm (for instance 1.1 meters). The structure 1 can for instance have an advantageous minimal height H of 20 cm, for instance, a height H of at least 30, 50 or 100 cm (for instance 0.7 meter). A maximum thickness D of the structure 1 can be, for instance, 10 cm (for instance a thickness of 9 cm), or another thickness, which may depend, for instance, on the height and width mentioned.

The panel-shaped structure 1 may be provided with a framework surrounding the substrate and the water reservoir, as in the exemplary embodiment. In particular, the structure 1 can be arranged to close off an inner space defined by the structure 1, containing the reservoir and the substrate, substantially hermetically from an environment, for instance, to prevent penetration of rain water and the like. As follows from the drawing and what follows below, the structure 1 may, however, be provided with a number of openings for the plants 3, and an opening for water replenishment, and an optional water drain. Optionally, a top part of the device can be provided with an aerator, for instance, an aeration opening which may or may not be closable by a valve, to aerate the top of the water reservoir 4 (to prevent vacuum formation). Such an aerator can for instance be provided in a top wall, rear wall, front wall or side wall of the device, and/or comprise an aeration channel or aeration hose brought into air communication with surroundings of the device, which will be clear to the skilled person. The aerator can for instance be integrated with the device. According to a further elaboration, such an aerator can be arranged for regulating the water flow (from the reservoir to the substrate). According to a further elaboration, the aerator can comprise an air duct or air hose, of which an air inlet terminates, for instance, in a bottom reservoir to be replenished by a main reservoir, and having for instance an air outlet terminating in a top part of the main reservoir.

In particular, the panel-shaped structure 1 features different, mutually separated inner spaces, viz., at least one or more inner spaces for holding the substrate 2, as well as one or more inner spaces for holding water (i.e., water reservoir 4).

As already mentioned, the substrate 2 as such can be designed in different manners, for instance of panel shape design, for instance as a single panel or a number of panel parts, as a growing mat or the like, or from compressed substrate parts, substrate parts held together by a binder, or otherwise.

The panel-shaped structure 1 can be provided with a hermetically closed top side, which is defined by a top wall 1a. The panel-shaped structure 1 can be provided with a hermetically closed bottom side, which is defined by a bottom wall 1c. In the example, the top and bottom sides of the structure are remote from each other.

The present panel-shaped structure 1 comprises a top and bottom side remote from each other, and comprises in particular two side walls 1b extending between the top side and bottom side, which, in this example, are parallel to each other. The side walls 1b are each hermetically closed, i.e., do not allow water to pass.

Further, the panel-shaped structure 1 comprises a rear wall 1e and a front wall 1d, which define a rear side and front side of the device. The rear wall 1e can close off the rear side completely, watertightly. The rear wall 1e can for instance contact a rear side of the substrate 2, to support the substrate. Alternatively, an air slit 7 can be provided between the rear side of the substrate 2 and an inner side of the rear wall 1e facing the substrate rear side (see FIG. 4). Optionally, the rear wall 2e is not hermetically closed, but, for instance, provided with one or more aeration openings in a wall part extending opposite the substrate 2, for aeration of the substrate 2.

Alternatively, for instance, a partitioning wall can be provided between the air slit 7 and a rear side of the substrate. In that case, this partitioning wall may, for instance, be hermetically closed, while the slit 7 can for instance form an additional water reservoir in the construction 1, which additional water reservoir extends behind the substrate and, for instance, can be in water communication with a main reservoir 4 for the purpose of increasing the water capacity.

The front wall 1d (shown in cutaway view in FIG. 1) may be provided with openings 1f to allow plants 3 which grow in or from the substrate 2 to pass to the surroundings. Such openings 1f can have different dimensions, having for instance a width (e.g., diameter in the case of circular openings) of at least 3 cm, or a different width.

Additionally, the panel-shaped structure 1 can comprise a number of inner walls 1g, 1h, 1i, to define one or more inner spaces for the reservoir 4. Such one or more inner spaces are, in particular, separated from the substrate 2 by the inner walls, so that water present in the inner space cannot be conveyed to the substrate directly. A gradual water delivery can be achieved in particular by the connecting means 6 mentioned (further discussed hereinbelow).

In the example, there are provided first inner walls or partitions 1h extending opposite the side walls 1b, and at a distance therefrom, to define therebetween first (substantially vertical) main reservoir parts 4a. A distance between mutually facing sides of a first inner wall 1h and sidewall 1b (i.e., a width of a respective reservoir part 4a) can for instance be greater than 1 cm, in particular greater than 2 cm, for instance greater than 4 or 5 cm. In a further elaboration, the distance between the mutually facing sides of the first inner wall 1h and side wall 1b can be, for instance, at most 10 cm, but this is not requisite. A volume of each first main reservoir part 1a can be, for instance, greater than 0.5 liter, and be, for instance, at least 1 liter, in particular at least two liters.

The first inner walls 1h are hermetically closed, i.e., watertight. The first inner walls 1h are substantially parallel to the opposite outer walls 1b, but this is not requisite. The first inner walls are, in particular, watertightly connected to the front wall 1d and rear wall 1e, to prevent water leakage. As follows from the drawing, the first inner walls 1h form a first partition between the substrate 2 and the main water reservoir 4. It is noted that alternatively, for instance, only one first (substantially vertical) main reservoir part 4a may be provided, and only one first inner wall 1h to separate this reservoir part 4a from the substrate.

Thus, the panel-shaped structure 1 can provide two substantially vertical columns, i.e., two substantially first main water reservoir parts 4a, which extend substantially along sides remote from each other of the substrate 2 provided in the structure 1, and are separated therefrom by the partition walls 1h. In this manner, the panel-shaped structure can be of compact design, and yet contain a relatively large amount of water.

The example comprises two inner walls 1i which bound and close off the two first (vertical) main reservoir parts 4a at the underside. The second inner walls 1i extend between the first inner walls 1h and respective lateral outer walls 1b, and, in this example, substantially at right angles therebetween. The second inner walls 1i are, in particular, watertightly connected to the front wall 1d, rear wall 1e, respective side walls 1b and first inner walls 1h, to prevent water leakage.

It goes without saying that only one second inner wall 1i is provided if only one reservoir part 4a is present. In this exemplary embodiment, each second inner wall 1i is provided with a passage 6d closed off by a valve 6c.

The substrate 2 can optionally be provided with a number of spaced apart openings 2a, each having, for instance, a width (e.g., diameter in the case of circular openings) of at least 3 cm, or a different width, for receiving crop, for instance, root parts of the crop and/or other crop parts. Such substrate openings 2a can be located behind plant passages 1f provided in the front wall, as in the example.

According to a further elaboration, the main water reservoir parts 4a can be coupled to each other via a water passage, in particular such that the two parts 4a can be filled via a single water supply operation.

In the example, a second main water reservoir part 4b is provided, which in itself provides additional capacity to hold water. The second main water reservoir part 4b can form a water passage between the first main water reservoir parts 4a, as in the example. In the example, the second main water reservoir part 4b is located completely above the inner space of the panel-shaped structure 1 filled by the substrate 2.

As follows from the drawing, in particular, the panel-shaped structure 1 of the present exemplary embodiment is provided with a third inner wall 1g, which extends opposite the top wall 1a, at a distance therefrom (and in particular substantially parallel to the top wall 1a), and between the two first inner walls 1h.

A distance between mutually facing sides of the third inner wall 1g and the top wall 1a (i.e., a height of a respective second reservoir part 4b) can for instance be greater than 1 cm, in particular greater than 2 cm, for instance greater than 4 or 5 cm. In a further elaboration, the distance between the mutually facing sides of the third inner wall 1g and top wall 1a can for instance be at most 10 cm, but this is not requisite. A volume of each second main reservoir part 1b can for instance be greater than 0.5 liter, and for instance be at least 1 liter, in particular at least two liters.

Thus, it follows that the water reservoir 4 can extend at least partly or partly (optionally: wholly) above a top side T of the substrate 2, in the vertical position of use of the growth device K. A width of the reservoir part 4b extending above the substrate 2 (measured in a direction parallel to a longitudinal direction of the top wall 1a, viewed in a front view of the device) can for instance be at least equal to 50% of the width of the substrate (measured in the same direction), for instance at least 90% of the substrate width, in particular more than 100% of the substrate width (as in the example), but this is not requisite.

According to a further elaboration, a height H1 of the water reservoir 4 is at least equal to half a height H2 of the substrate 2 (measured in the vertical position of the reservoir, i.e., in a direction at right angles to the bottom and top walls 1a, 1c, or a direction parallel to the lateral walls 1b). A height H1 of the water reservoir 4 can for instance be at least equal to 75% of the height H2 of the substrate, for instance at least 90% of the height H2, but this is not requisite.

In an alternative elaboration, the panel-shaped structure can for instance be provided only with such a main water reservoir part 4b extending above the substrate 2 (with the partition wall 1g extending up to the sidewalls 1b), without use of reservoir parts 4a extending (vertically) along the substrate. In that case, for instance, a water connection, for instance a closed channel or hose, may be provided to convey water from the main water reservoir part 4b extending above the substrate 2 to the connecting means 6.

The various walls 1a-1g of the panel-shaped structure 1 can be manufactured from different materials, for instance, from wood, plastic, a combination of such materials and/or other materials. According to a further elaboration, the walls 1a-1g are mutually watertightly connected. According to an elaboration, two or more of the walls 1a-1g can be manufactured integrally in one piece, for instance by means of plastic injection molding, plastic vacuum forming or the like.

Figure 6:
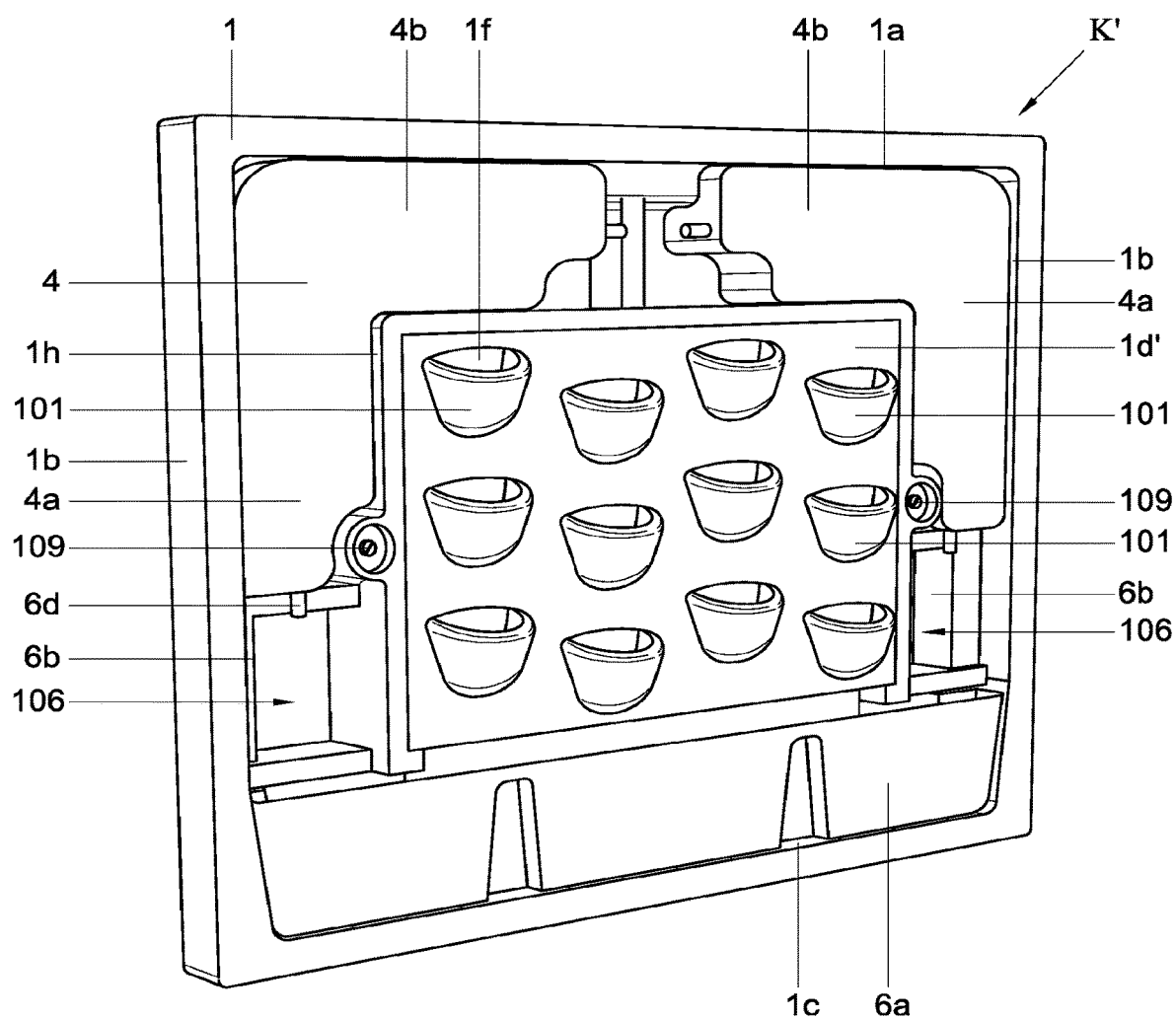
FIG. 6 shows a cutaway perspective of a part of a further exemplary embodiment of the invention.

Further, at least one of the walls can be detachably fitted to a remaining part of the structure, for instance to obtain access to the inner space of the structure 1, for instance to provide and/or replace the substrate 2, to place one ore more water basins providing the reservoir, or the like. The further elaboration K' shown in FIG. 6 is for instance provided with a (central) front wall part 1d' which is detachably coupled to a remaining part of the device K' by means of operable coupling means 109 (such as pin/hole couplings, thread couplings, clamped couplings, or the like).

As mentioned, the device can in particular be designed to be used in a vertical position. The device may for instance be provided with means for suspending the device from a vertical wall. Such means can for instance comprise one or more hooking means or suspension hooks 8, which may for instance be fastened to the rear wall 1e, suspension clamps, a suspension element, such as wire, and/or be designed differently. In addition, the device can for instance be held in a vertical position, by resting the device by the bottom wall 1c on a support extending under it. Clearly, the device can also be used in an inclined condition, for instance with the front facing obliquely up or obliquely down.

In this example, the connecting means 6, for feeding water from the main reservoir 4 to the substrate 2, comprise a bottom reservoir 6a extending substantially beneath the substrate. The second partition walls 1i form partitions between this bottom reservoir 6a and the main water reservoir 4. The bottom reservoir 6a is bounded along a bottom side by an inner side of the bottom wall 1c of the panel-shaped structure. A front and rear side of the bottom reservoir 6a are included between mutually facing inner sides of the front wall 1d and rear wall 1e of the panel-shaped structure 1. Further, the bottom reservoir 6a is bounded on both sides by lower parts of the side walls 6b (see FIG. 2), which extend between the second inner walls 1i and bottom wall 1c.

In particular, an underside of the substrate 2 facing the bottom of the device 1c is in direct contact with water present during use in the bottom reservoir 6a, such that this water can be sucked up into the substrate 2 (for instance by capillary forces).

Alternatively, the substrate 2 can be provided with water suction means, for instance one or more water suction cords or capillary means, which reach from the substrate 2 into the bottom reservoir to draw water therefrom.

The connecting means 6 of the example are provided with a flow regulator 6b, to regulate water flow from the main reservoir 4 to the bottom reservoir 6a extending beneath the substrate. Preferably, the flow regulator 6b is designed to work autonomously, in particular under the influence of gravity, without supply of electrical energy. Alternatively, the flow regulator 6b can be provided with electric regulating means, one or more sensors, a control and electric power supply.

In this example, each flow regulator 6b comprises valve means 6c-6e (schematically represented), for instance a regulating valve 6c for closing off a water passage 6d in a closed position and releasing it in a release position, while the position of the regulating valve 6c is controllable under the influence of a float 6e located in the bottom reservoir 6a and coupled to the valve (for instance via an operating arm). The configuration is such that given a bottom reservoir 6a filled to a defined first water level, the float 6e floating in this water holds the valve in the closed position. Through consumption of water, the water level in the bottom reservoir 6a drops, and thus the position of the float 6e. When the water level reaches a threshold value, which is lower than the first water level mentioned, the float 6e reaches a second float position where the valve is brought to the release position, to release the water passage 6d. Thereupon, the bottom reservoir can be automatically replenished with water present in the main reservoir 4, until the valve, under the influence of the float, is returned to the closed position.

According to a further elaboration, the connecting means 6 can be provided with a user-settable control, to set a threshold value as mentioned. The control can for instance comprise a position of the float relative to the valve, if a valve/float mechanism is used.

Alternatively, the flow regulator can for instance comprise a regulator based on vacuum formation, in particular an aerator of the main reservoir 4. In that case, it is preferred that a water passage 6d between the main reservoir 4 and the bottom reservoir is closable by means of an operable shut-off valve, for instance a tap, in order for the main reservoir to be filled with the passage closed off, whereupon the passage can be opened and regulation can proceed via an aerator setting. In such a case, the aerator, for instance an aerator pipe extending from the bottom reservoir to the main reservoir 4, may be arranged not to feed air to the main reservoir until the water level of the bottom reservoir, which falls during use, reaches a threshold value (whereby for instance a lower end of an aerator pipe located in the bottom reservoir is exposed for passing air).

Through use of the bottom reservoir 6a, a relatively uniform water transmission to the substrate 2 can be achieved. As follows from FIG. 2, a bottom side B of the substrate 2 can for instance be located at a distance from an opposite inner side of the bottom wall 1c. Alternatively, the substrate 2 can make contact with the bottom wall 1c.

Optionally, the device K can be provided with a drain opening 12 closed by an operable shutoff, for instance to empty the water reservoirs 4, 6a if the device K is to be stored or transported. The shutoff of the drain opening can be brought from a closed position to a pass position clearing the opening, which will be clear to the skilled person. In the example, such a drain opening 12 is provided adjacent the bottom side of the device, to terminate in a bottom part of the bottom reservoir, to enable draining of both the bottom reservoir 6a and the main water reservoirs 4a, 4b.

It is noted that use of a bottom reservoir 6a is not requisite. For instance, the connecting means can be provided with one or more water supply channels, connecting hoses, capillary means and/or the like, to feed water in a controlled manner from the main water reservoir 4 to the substrate.

Further, the device is provided with filling means, for filling the main water reservoir 4 with water. In the example, the filling means comprise a, preferably closable, filling opening 11, which may be provided for instance in the top wall 1a (or, alternatively, in a top part of another wall) of the panel-shaped structure. A user can feed water via the filling opening 11 into the main reservoir 4, for instance utilizing a water supply hose, watering can, or the like. Filling can be done such that the main water reservoir 4 is substantially completely (so, both the first reservoir parts 4a and the second reservoir part 4b) filled with water. Then, for a relatively long period of time, for instance a number of weeks, water is available in the structure 1, which water can be delivered in a controlled manner, via the connecting means 6, to the substrate.

As mentioned, the device K can be used with advantage in a method in which the device is positioned obliquely or vertically, while the water reservoir 4 is filled at least partly (preferably virtually completely) with water to provide planting 3 present in the device with water. In particular, the device can offer a self automatic watering of the plants 3, for a relatively long period of time (for instance at least one week) without a water drip tube or separate pump means needing to be active, and without the device being provided with such a drip tube and pump means.

The device K can be utilized autonomously, as a "plantscape", is compact, can be of relative light weight design, at a location desired by a user, preferably without connection to a pressure pipe or line for water supply. In the course of time, for instance after a few weeks of water consumption by the plants 3, the user can replenish the water reservoir 4 to a desired initial level again.

Figure 5:
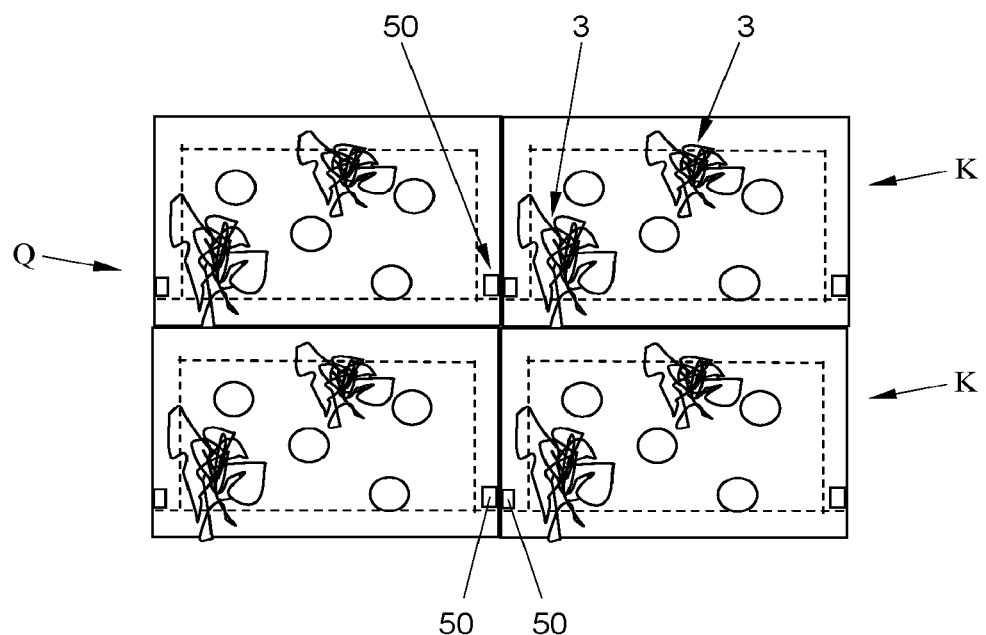
FIG. 5 shows a series of growth devices, in a vertical position.

FIG. 5 shows a further elaboration, comprising a series of growth devices K according to the invention. The devices K can be of the same design as the devices shown in FIGS. 1-4. In particular, at least two devices K can be positioned by their longitudinal sides against each other (and each for instance in the vertical or inclined position mentioned), i.e. with opposite side walls 2b against one another. In particular, at least two devices K can be positioned by their longitudinal sides against one another, and each for instance be stacked onto each other, i.e., with the bottom wall of one device on a top wall of the other device disposed therebeneath. In this manner, a series of devices can form a green wall Q, as in FIG. 5.

The devices K of the series can for instance be fastened to each other by means of fastening means. In addition, for instance adhesive means can be used, for example, glue, for fastening the devices K of the series by mutually facing sides to each other. Furthermore, the walls of the devices K can for instance be designed or formed for cooperation with each other so as to form a stable series, for instance through the use of tongue-and-groove engagement, clamping couplings, snap couplings, or the like.

Further, the devices K of the series can be designed for sharing the water present in those devices. In particular, to this end, water lead-through passages 50 (schematically shown in FIG. 5) can be provided for bringing main reservoirs 4 of the devices K in water communication with each other. Such water passages can for instance comprise valve means, lead-through channels, feed hoses and the like, which will be clear to the skilled person.

FIG. 6 shows a part of a further elaboration K' of the invention, which is distinguished from the configuration represented in FIGS. 1-4 in that the front wall is provided with a part 1d' which is preferably detachable from a remaining part of the device. In this example, the front wall 1d' is provided with plant supports 101 extending in a direction away from the substrate, which supports are provided at respective plant passages 1f. The plant supports 101 can for instance be cup-shaped, at least, with curved wall parts projecting from the front wall. In particular, each plant support 101 can bound a space with a plane defined by a front of the front wall 1d', which space can for instance be partly filled with plant substrate. The plant supports 101 can be formed in different manners, which will be clear to the skilled person.

Further, for instance, mutually different front walls, or front wall parts, can be available for forming a device K'. For instance, a first front wall part 1d' can be provided which comprises a first number of plant supports 101, or a first type of plant support. A second front wall part can be provided which comprises a second number of plants supports 101, different from the first number, or a second type of plant support, different from the first type. In that case, it is advantageous if the first front wall part 1d' is replaceable by the second front wall part 1d'.

In this manner, a modular "plantscape" system can be obtained, wherein a user can determine which front wall module (i.e. front wall part) is utilized to compose a device K', for instance depending on a desired type of plant, plant size, and number of plants.

As further shown in FIG. 6, the connecting means can for instance be provided with a separate chamber 106 (two, in this example), which is located between a bottom reservoir 6a and a main water reservoir part 4a, in particular for receiving the valve means mentioned (not shown in FIG. 6) and positioning them relative to a lead-through channel 6d.

Figure 7:
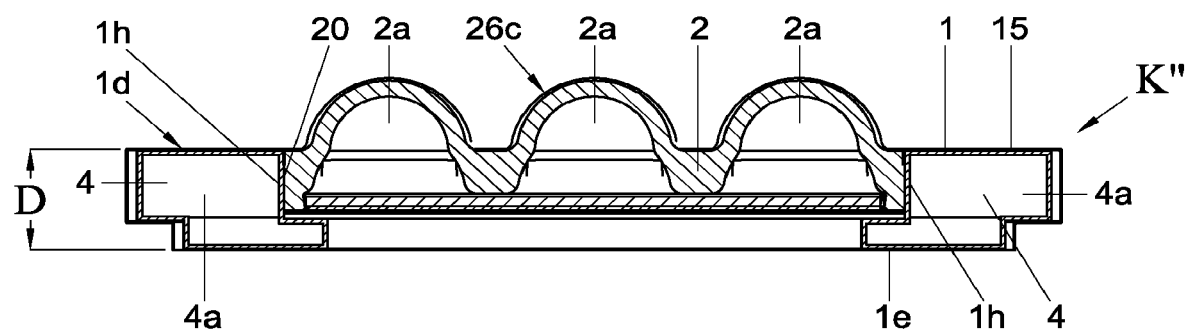
FIG. 7 shows a cross sectional view of a further exemplary embodiment of a growth device according to the invention.
Figure 8:
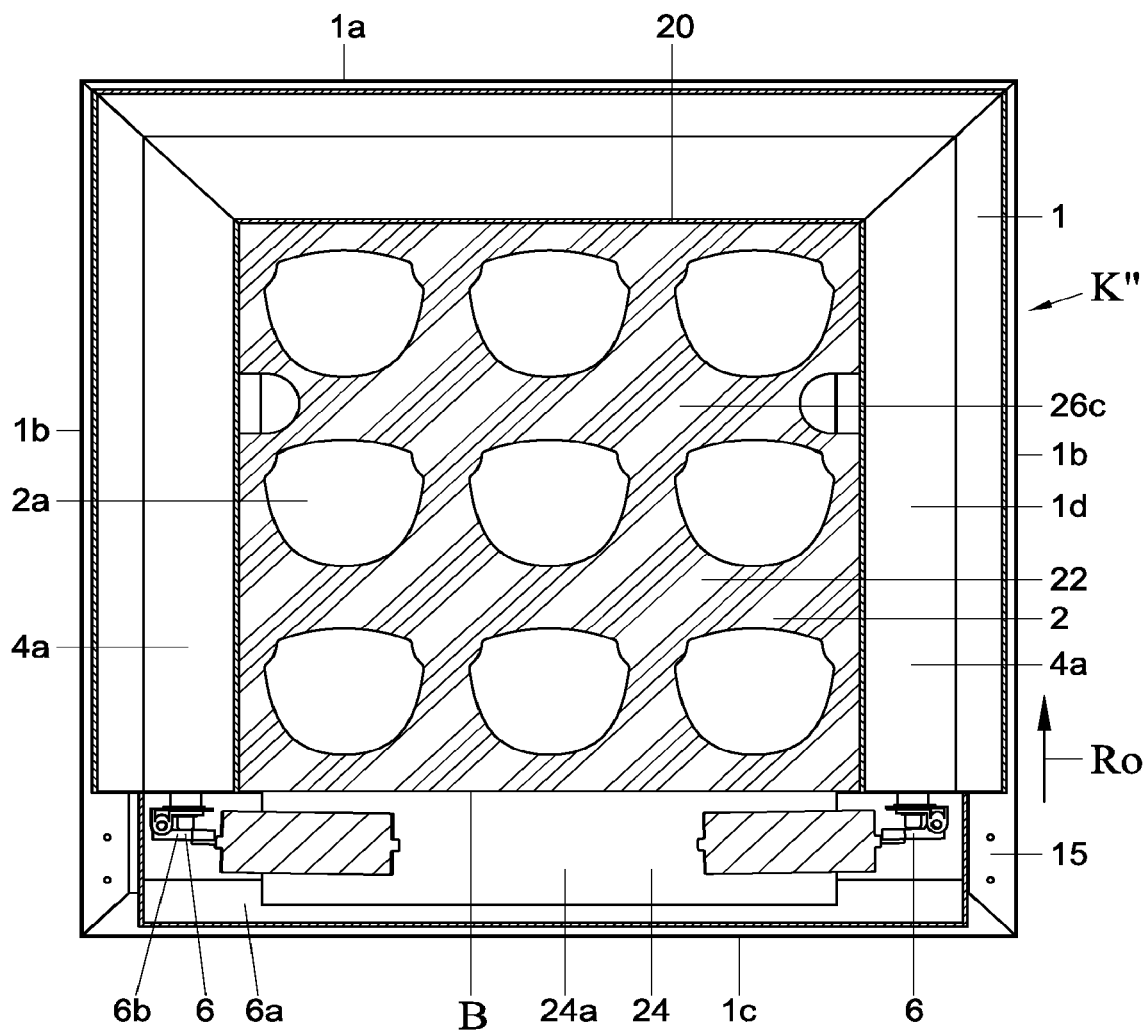
FIG. 8 shows a partly cutaway front view of the exemplary embodiment of the growth device as shown in FIG. 7.

In FIGS. 7 and 8 there is shown a further embodiment of the growth device K" according to the invention. For the sake of clarity, the parts of the growth device K" that are identical to the parts in the earlier described embodiments of the growth device K, K' will not be described in further detail here. For the description thereof reference is made to the description belonging to FIGS. 1-6. The growth device K" as shown in FIGS. 7 and 8 comprises a panel-shaped structure 1. In this embodiment, the panel-shaped structure comprises a frame 15 having therein a receiving opening 20 in which a substrate 2 is included which is designed as a cassette 22 (see also FIGS. 9 and 10). The cassette 22 is designed for receiving crop 3 (not shown). The frame 15 of the panel-shaped structure 1 is provided with a top and bottom side 1a, 1c remote from each other, and comprises in particular two side walls 1b extending between the top side and the bottom side, which, in this example, are parallel to each other. The frame 15 is further provided with a rear wall 1e and a front wall 1d. The front wall 1d of the frame 15 links up with the front 26c of the plant receiving part 26 of the cassette 22. The rear wall 1e of the frame 15 can wholly or partly close the frame 15. In the frame 15, a water reservoir 4 is included comprising a top reservoir 4b and two side reservoirs 4a. Further, in the frame 15, the connecting means 6 are provided for bringing the water reservoir 4 in communication with the cassette 22 for moistening the crop included in the cassette 22. Preferably, the water reservoir 4 extends substantially above a bottom side B of the substrate 2 in a vertical position of use of the growth device, as in the present exemplary embodiments. In the examples, the main water reservoir 4 is completely separated from the substrate 2. The connecting means can effect a particularly well-controlled water delivery. In a further elaboration of the growth device K" the water reservoir 4 can be provided as a single product that can be placed as a whole in the frame. Such a water reservoir 4 can for instance be manufactured from a metal or a plastic and is impermeable to water. When such a water reservoir 4 is used, the frame 15 does not need to be provided with completely closed walls but only needs to be designed such that the water reservoir 4 is retained in the destined position in the frame 15. The water reservoir 4 is provided with an opening, preferably at a top side of the top reservoir 4b, for filling the water reservoir 4.

Figure 9:
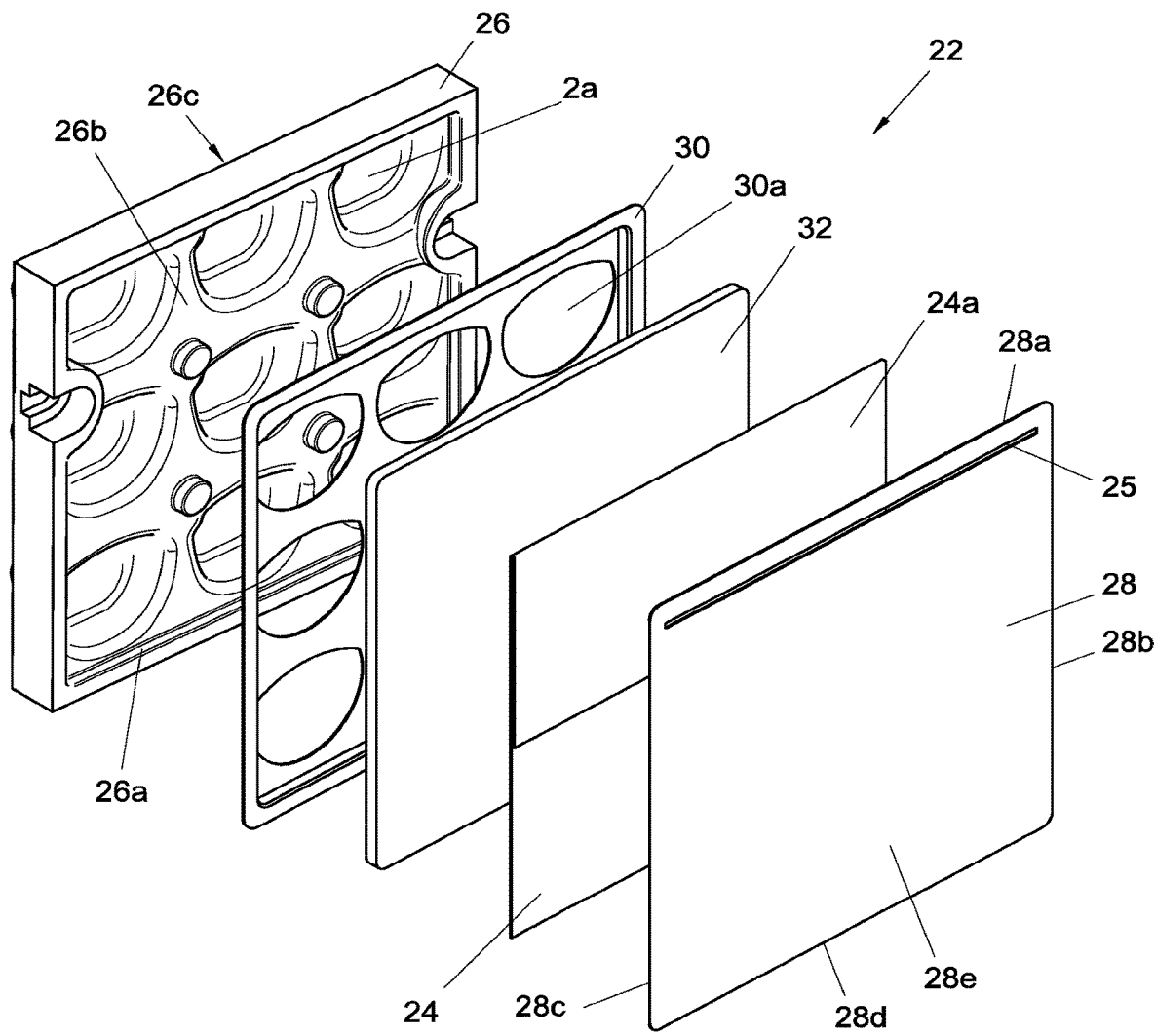
FIG. 9 shows a perspective exploded view of a cassette according to an exemplary embodiment of the invention.
Figure 10:
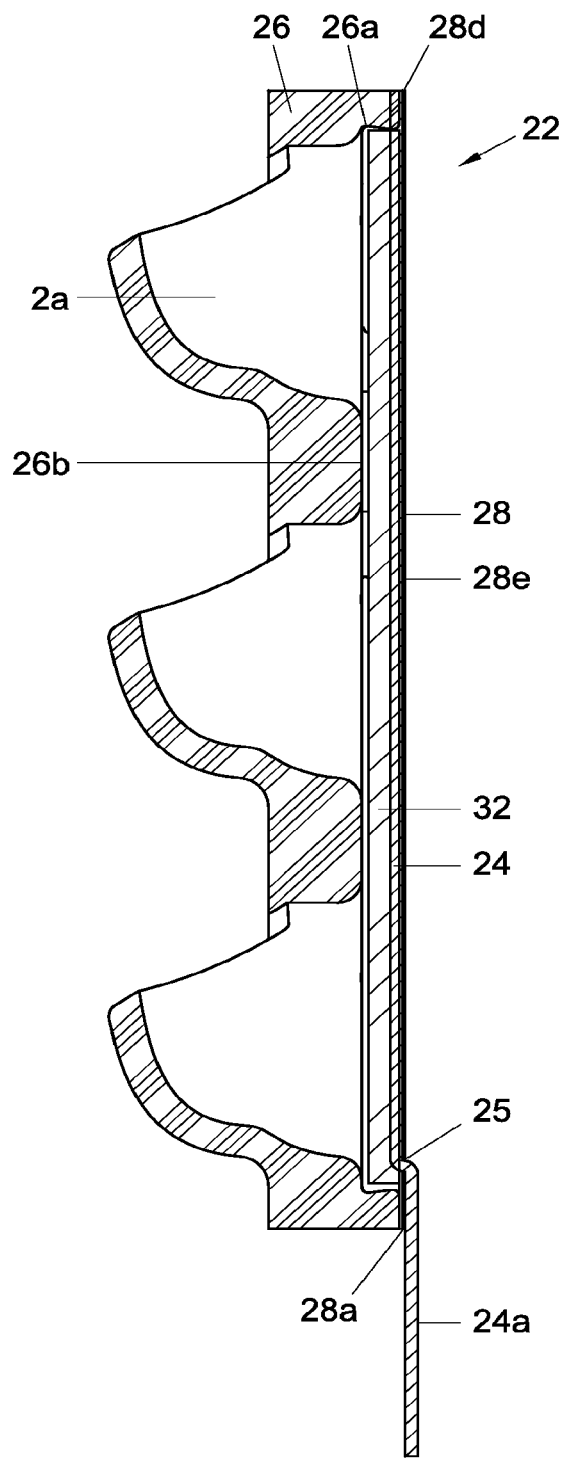
FIG. 10 shows a cross sectional side view of the cassette of FIG. 9.

In the exemplary embodiment of the growth device K" shown, the substrate 2 is designed as a cassette 22. In FIGS. 9 and 10, an example of such a cassette 22 is represented. The cassette 22 comprises a plant receiving part 26 which can be manufactured, for instance, from a substantially rigid material. In the plant receiving part 26, passages 2a are provided for taking up plants and passing through the roots of these crops to the capillary cloth 24 which is located behind the plant receiving part 26 in the cassette. The rear side of the cassette 22 is formed by a rear part 28 which is for instance formed from a plate of form retaining material, such as a metal. The rear part 28 can be clamped in the plant receiving part 26 by snapping the respective circumferential sides 28a, 28b, 28c, 28d in the projecting circumferential edge 26a of the plant receiving part 26. Between the rear part 28 and the plant receiving part 26 extends a capillary cloth 24. This cloth 24 is attached free of tension to the rear part 28 in that the cloth 24 is clamped with the aid of a plant growth layer 32 and/or a strengthening plate 30 and the plant receiving part 26. In the example of the cassette 22 shown in FIGS. 9 and 10, the rear part 28 comprises an elongated opening 25 through which extends the capillary cloth 24 (see FIG. 10). The plant growth layer 32 abuts against a surface side of the capillary cloth 24 facing the plant receiving part 26. Further, between the plant growth layer 32 and the plant receiving part 26 a strengthening plate 30 is provided. The strengthening plate 30 can for instance be of a metal or a plastic and contains openings 30a which correspond to the openings 2a in the plant receiving part 26. In the mounted condition of the cassette 22, as shown in FIG. 10, the cloth 24 is therefore clamped between the plant growth layer 32 and the rear part 28. Also, in an alternative design of the cassette 22 (not shown), the cassette may only contain either the strengthening plate 30 or the plant growth layer 32. Further, it is also possible that the capillary cloth 24 is fixed onto the rear part 28 with the aid of fastening means provided on the rear part 28, such as folded over circumferential edges of the rear part 28.

In the elaboration of the growth device 1 as shown in FIGS. 7 and 8, the cassette 22 is included such that the elongated opening 25 is located substantially just above the bottom reservoir 6a. In that case (see also FIG. 10), a part 24a of the capillary cloth 24 extends through the elongated opening 25 in a direction away from the rear part 28, at least from a rear side 28a of the rear part 28, substantially in line with the rear part 28. The projecting part 24a extends at least partly in the bottom reservoir 6 (see FIG. 8). As a result of the capillary cloth 24, for instance formed from microfiber woven, having good capillary properties, the water that is present in the bottom reservoir 6a is suctioned by means of capillary action from the reservoir in the direction Ro and distributed over the entire surface of the capillary cloth 24. As the roots of the crops abut against the capillary cloth, they are provided with water and possibly nutrients. With this construction of the cassette 22 it is achieved that the water is uniformly distributed over the capillary cloth 24 with a uniform flow rate. As the capillary cloth 24 is clamped in the cassette 22 free of stress, the water is absorbed in the capillary cloth 24 over a greater height than when the capillary cloth 24 is not included free of stress in the cassette 24.

Owing to the specific construction of the substrate 2 in the form of a cassette 22 it is possible to limit the thickness D of the growth device K". The cassette can for instance have a thickness of about 70 mm or possibly less. This is particularly favorable for the aesthetic appearance of the growth device. It is naturally also possible that the cassette has a greater thickness.

Figure 11:
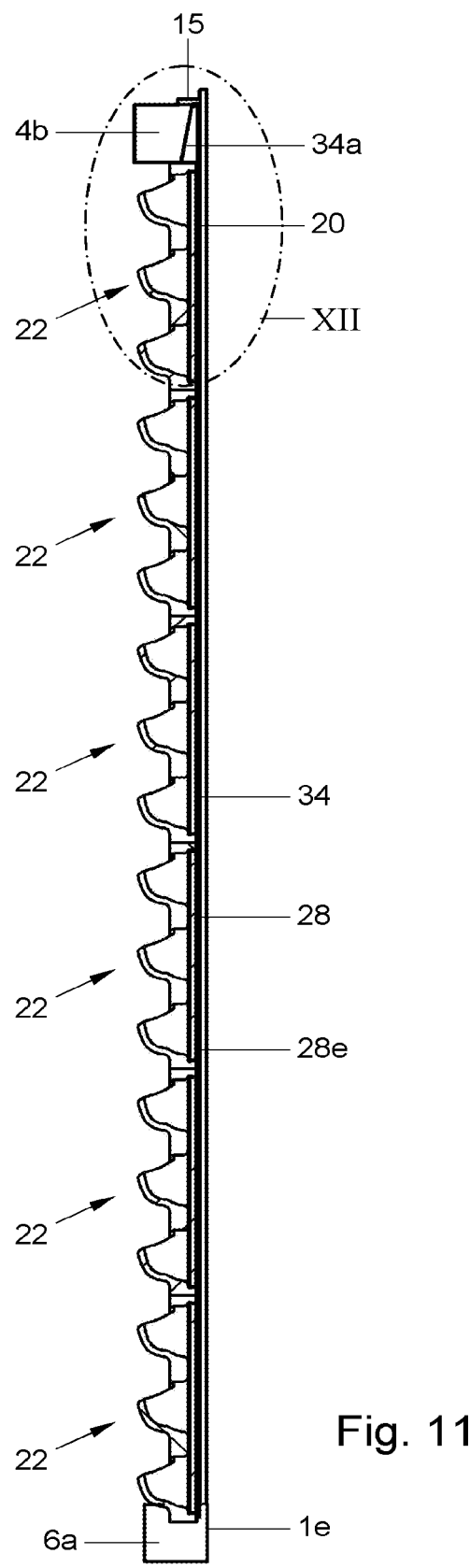
FIG. 11 shows a further exemplary embodiment of the growth device according to the invention in which multiple cassettes are received.
Figure 12:
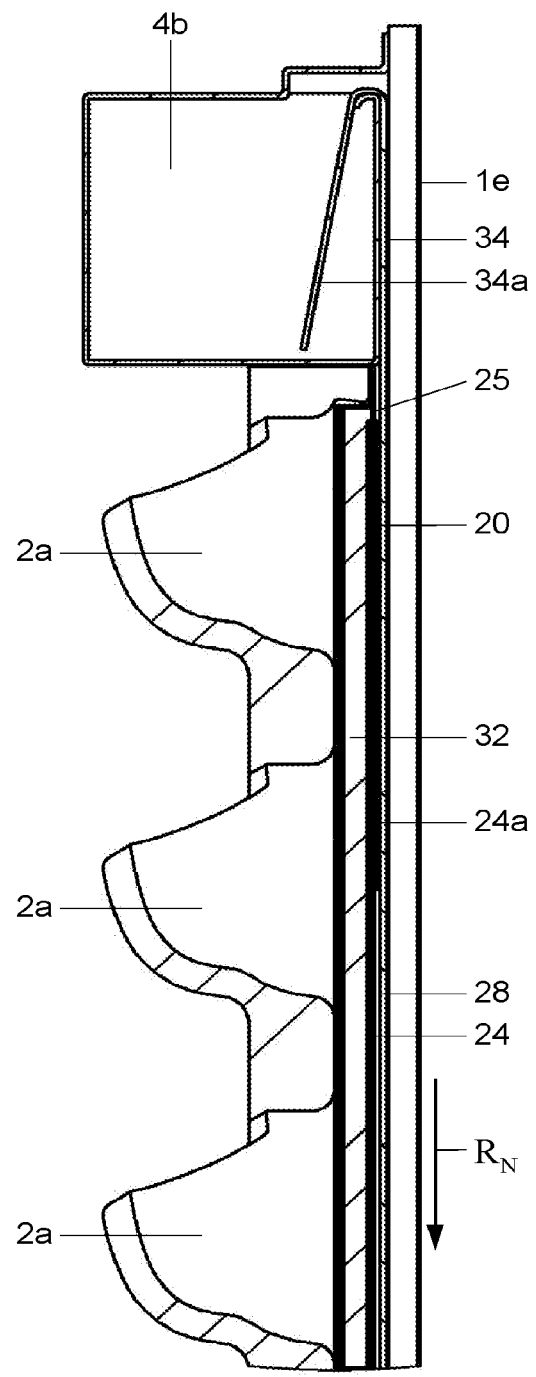
FIG. 12 shows a detail of the growth device shown in FIG. 11.
Figure 13:
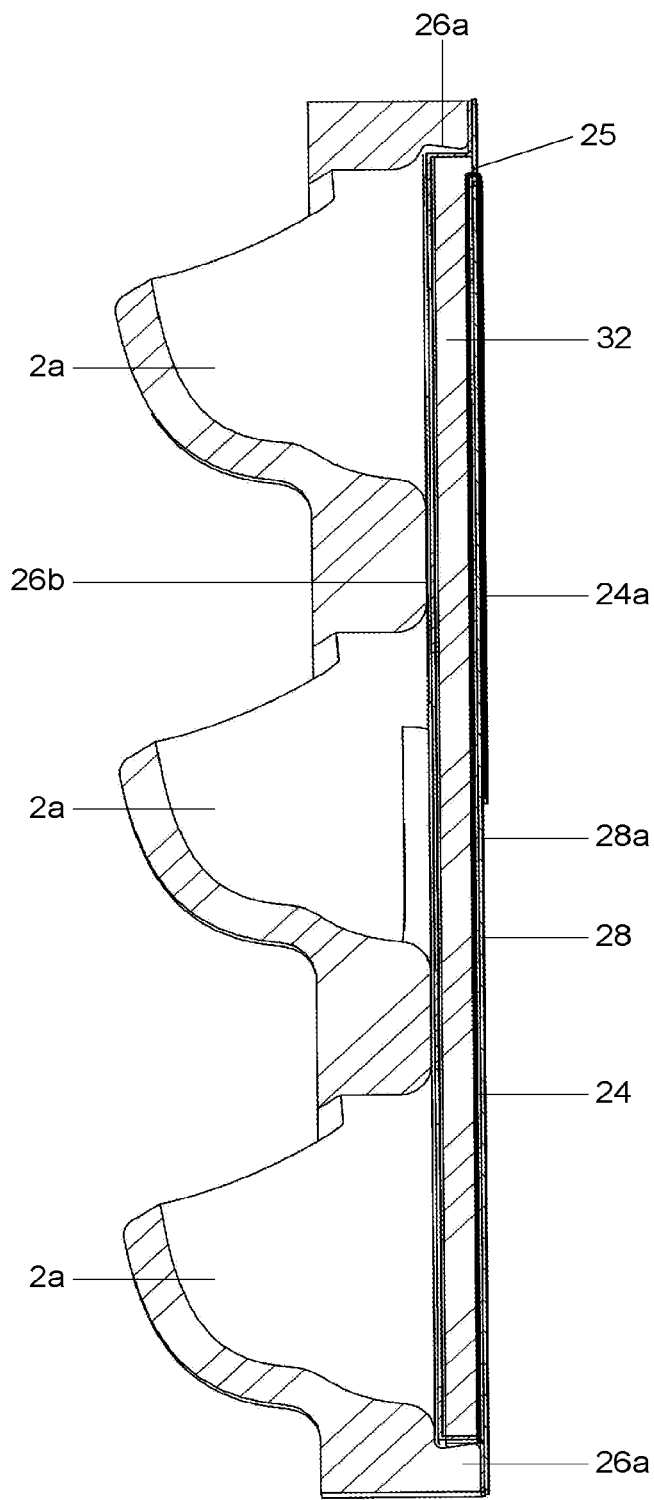
FIG. 13 shows a cross sectional side view of a cassette from the growth device of FIGS. 11 and 12.

In FIGS. 11-13, a further exemplary embodiment of a growth device K''' according to the invention is shown. The growth device K''' comprises a panel-shaped structure 1 provided with a frame 15 with a receiving opening 20 designed for receiving several cassettes 22. The receiving opening 20 can have a dimension such that both in vertical and horizontal direction, multiple cassettes 22 can be placed side by side. The cassette 22 (see FIG. 13) is substantially equal to the cassette 22 as shown in FIG. 10. The only difference is that the rear part 28 is connected the other way around to the plant receiving part 26. As a result, the elongated opening 25 extends substantially at a short distance parallel to a first circumferential side 28a of the rear part. The circumferential side 28a is provided at a top side of the rear part 28 and points in the direction of the top reservoir 4b which is provided in the frame 15 of the growth device K'''. As the opening 25 is provided at the top of the rear part 28, the part 24a of the capillary cloth 24 projecting through the opening 25 is folded back along the rear side 28a of the rear part 28, at least the surface side of the rear part 28 which points away from the plant receiving part 26 (see FIG. 13). Through such a construction of the cassette 22 it is designed to be brought into fluid communication with a capillary rear wall 34 (see FIGS. 11 and 12). The receiving opening 20 which is provided in the frame 15 of the growth device K''' comprises the capillary rear wall 34 mentioned. This capillary rear wall 34 is formed by, for instance, a second capillary cloth and is for instance fixed onto sections of the frame 15. The capillary rear wall 34 can for instance be fastened to the frame 15 with the aid of suitable fastening means, such as Velcro tape. The capillary rear wall 34 extends at a top side of the growth device K''' at least partly in the water reservoir 4, at least, in the top reservoir 4b. In the receiving opening 20, multiple cassettes 22 are provided while of each cassette 22 a part 24a of the capillary cloth 24 is positioned against the capillary rear wall 34. As the capillary rear wall 34 terminates in the top reservoir 4b of the water reservoir 4, water is siphoned from that reservoir and, through capillary action, guided in the direction RN to the respective projecting parts 24a of the respective capillary cloths 24 of the cassettes 22. Through the capillary action of the capillary cloths 24, the water is taken up from the capillary rear wall 34 and passed to the roots of the crops. The capillary rear wall 34 preferably extends at an underside thereof into the bottom reservoir 6a.

With the aid of the construction of the growth device K''' as shown in and described with reference to FIGS. 11-13, in a simple manner, a large wall can be provided with plants. Such a growth device K''' can for instance cover a wall of a height of about 6 meters.

Figure 14:
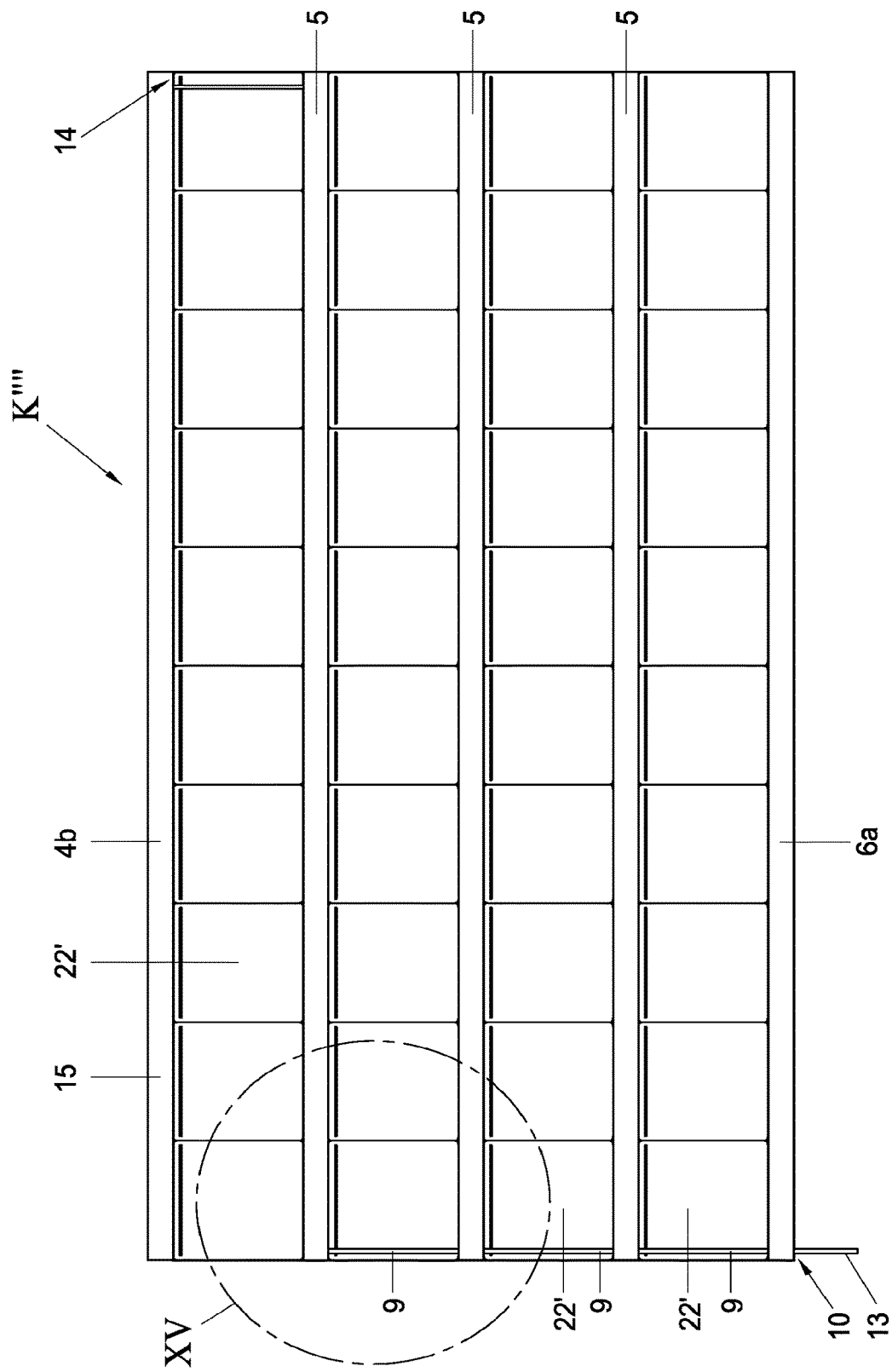
FIG. 14 shows a schematic front view of a further exemplary embodiment of the growth device according to the invention in which multiple cassettes are taken up.
Figure 15:
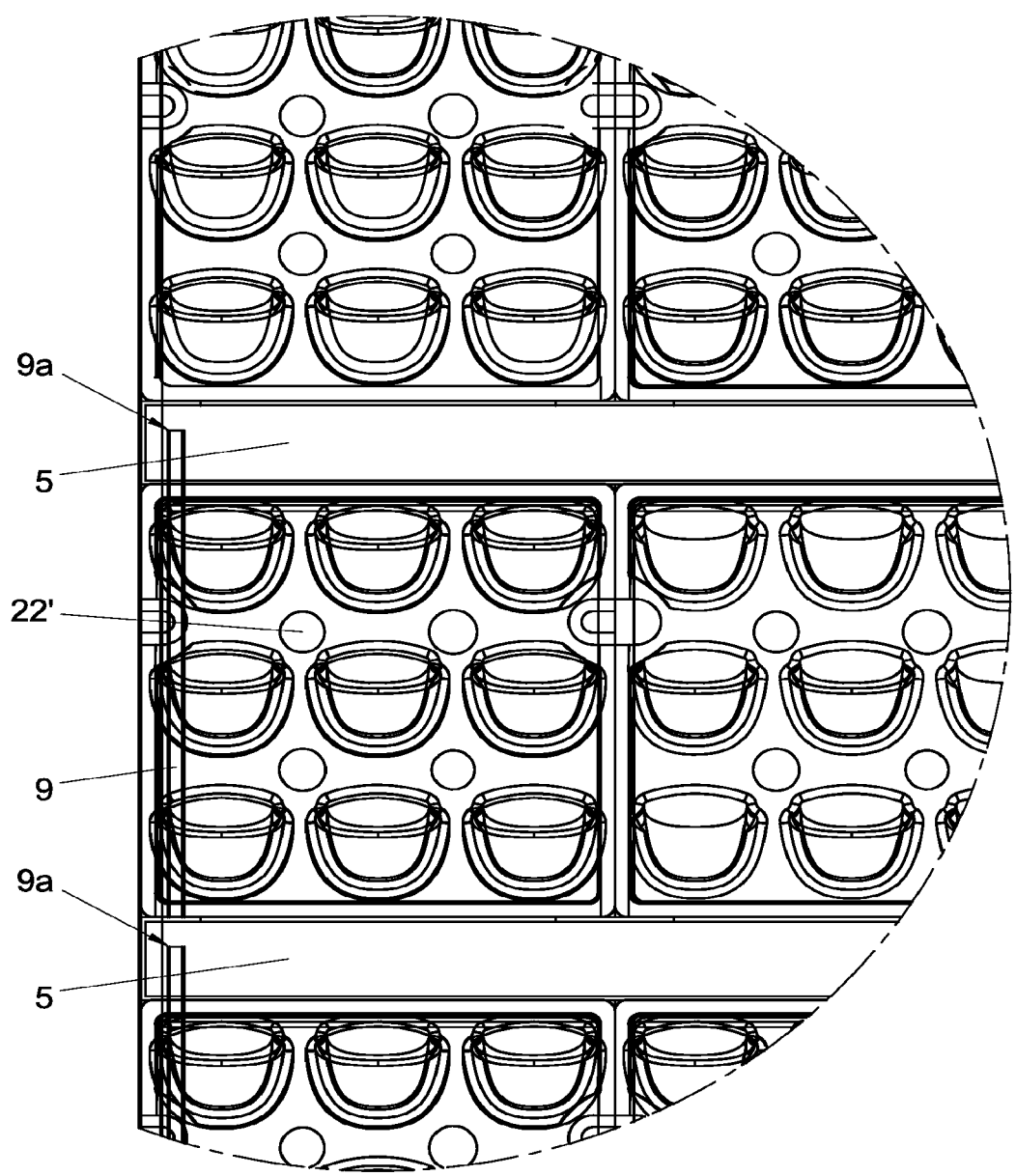
FIG. 15 shows a detail of the growth device according to FIG. 14.

The embodiment of the growth device K'''' as shown in FIGS. 14 and 15 also provides in a simple manner for a large wall provided with plants. The device K'''' comprises a panel-shaped structure 1 provided with a frame 15 with multiple receiving openings 20 for receiving multiple cassettes 22' beside one another and above one another. The cassette 22' is substantially equal to the cassette 22 as shown in and described with reference to FIGS. 10 and 13. The only difference is that the rear part 28 is not provided with an elongated opening 25 but that at a first circumferential side 22a' of the cassette 22, an elongated opening 25 is provided between the rear part 28 and the plant receiving part 26. To this end, if necessary, a shallow groove can be provided in the edge of the respective rear part 28 and plant receiving part 26 such that the capillary cloth 24, at least a part 24a thereof, can be inserted through the elongated opening. It is preferred that the rear part 28 is connected to the plant receiving part 26 in a fluid-tight manner on the remaining three sides so as to prevent undesired leakage.

Figure 16:
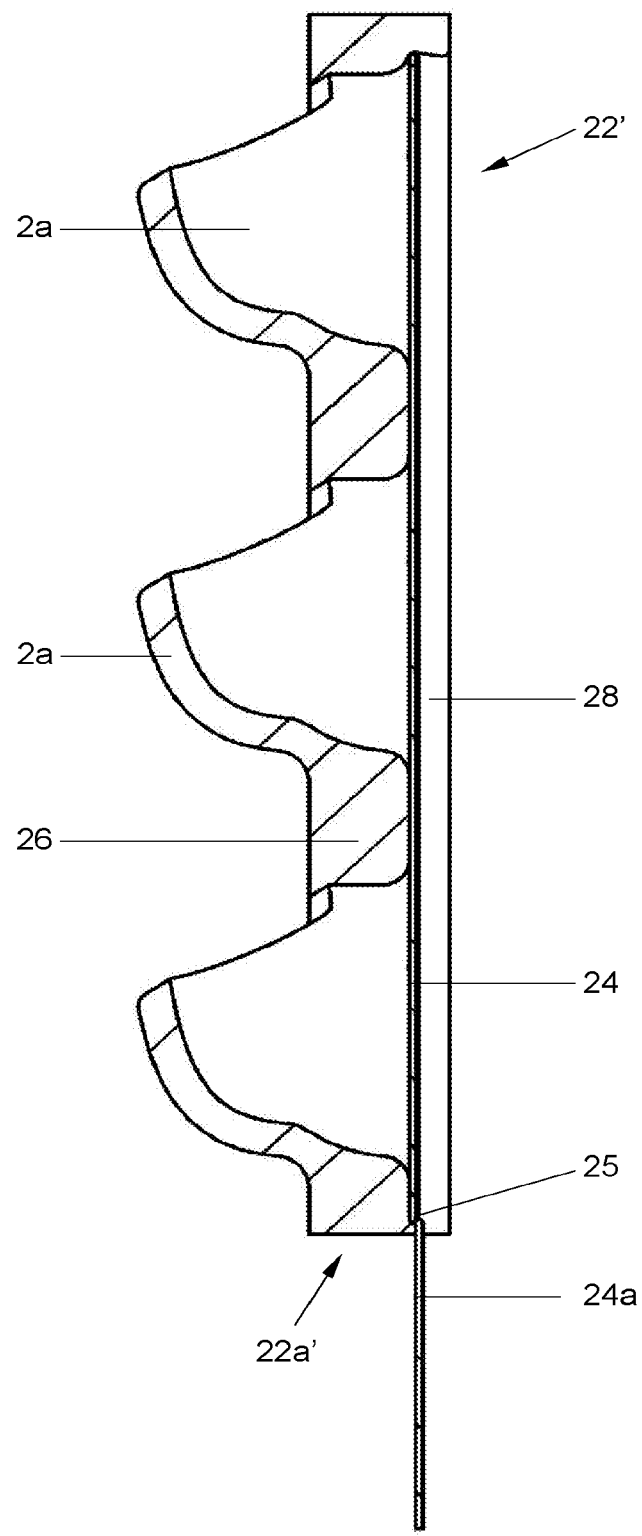
FIG. 16 shows a cross sectional side view of a further embodiment of a cassette according to the invention.

The growth device K'''' comprises a top reservoir 4b, which preferably extends along the entire top side of the growth device K'''', and a bottom reservoir 6a which preferably extends along the entire lower side of the growth device K'''' so that the projecting parts 24a (see FIG. 16) of the capillary cloth 24 of the respective lower panels 22' extend at least partly in the water in the bottom reservoir 6a. Between the rows of cassettes 22', which, in use, extend substantially horizontally, there are further reservoirs 5. These reservoirs 5 function at the same time as bottom reservoir for the cassettes 22' present above the reservoirs 5 and as top reservoir for the cassettes 22' which are present below the respective reservoirs 5. In the top reservoir 4b, a filling opening 14 is provided for filling all reservoirs 5, 6a. When the top reservoir 4b is provided with water, this water will flow via the filling opening 14 in the direction of a lower reservoir 5. In the reservoir 5, an overflow 9 is provided which is in fluid communication with a further reservoir 5 which in turn is located at a lower level. A first end 9a of the overflow 9 extends partly into an upstream reservoir 5, over a part of the height of this respective reservoir 5. On a downstream side of the overflow 9, the overflow 9 terminates for instance at a top side of the reservoir 5. A downstream end of the overflow 9 can also extend at least partly in the inside of the reservoir 5. When a top intermediate reservoir 5 is filled via the filling opening 14, then, when the water level in this intermediate reservoir 5 reaches the upstream end 9a of the overflow 9, the excess of water will flow via the overflow 9 to a intermediate reservoir 5 lower down. In this manner, all downstream reservoirs 5 fill up and thus form a buffer storage of water for moistening the plants present in a cassette 22' located upstream thereof. When all reservoirs 5, 6a are filled, the ends 24a of the capillary cloths 24 of the respective cassettes 22' will take up water through the capillary action of the respective lower reservoirs and pass it on to the roots of the plants that are provided in the substrate openings 2a of the respective plant receiving parts 26 of the respective cassettes 22'. On a downstream side of the growth device K'''', a further overflow or drain 13 can be provided. Also, in the bottom reservoir 6a, a water sensor 10 can be provided, which detects a possible excess of water and provides for discharge of this water via the further overflow or drain 13.

Owing to the construction of the substrate 2 as cassette 22, 22' and the design of the panel-shaped structure provided with water reservoir 4', 5 and connecting means 6, a growth device K, K', K'', K''', K'''' is obtained which can function without use of electrically driven means. In other words, such a growth device can provide the crops included therein with water and/or nutrients for an extended period of time, for instance a month, without this requiring electricity. The water from the water reservoir is supplied to the crops in a dosed manner with the aid of the capillary provisions in the growth device.

It will be clear to the skilled person that the invention is not limited to the exemplary embodiments shown and described. Various modifications are possible within the framework of the invention as set forth in the appended claims.

For instance, provision can be made for one or more water reservoirs extending vertically along the substrate 2, for instance for replenishing a bottom reservoir extending beneath the substrate 2 (the bottom reservoir being in contact with the substrate mat to deliver water to it).

The panel-shaped structure 1 can be designed in different manners, and in particular can comprise a basic element which serves as carrier of water for the purpose of for instance capillary plant systems or plant systems which are provided with water via pumping systems.

The panel-shaped structure 1 can be provided with substantially closed lateral outer sides. In particular, the structure 1 can form a substantially vertically suspendible plant panel, having a closed top side, a closed bottom side, closed sides, and having, for instance, one or more vertical water tanks integrated in the panel.

The panel-shaped structure has no specific shape, and can be designed to be suspended from a wall or a ceiling, or, for instance, to be placed free in a space.

According to a further elaboration, the dimensions of the panel-shaped structure can substantially determine a water content that is present (i.e., water reservoir volume).

The device can be configured to store water directly in the panel-shaped structure, or in one or more separate containers (one or more water basins) which are receivable in the panel-shaped structure (in cavities suitable for these one or more containers). In the latter case, it is advantageous if the panel-shaped structure comprises different, detachable structural parts, such that the structure can be opened to make an internal cavity accessible for placing a container or water basin in the structure.

According to a further elaboration, the water storage spaces of different devices may be mutually couplable, to provide each other with water.

Further, the devices (in particular, different panel-shaped structures) may be configured to be mechanically intercoupled or interconnected.

The level of the water in a reservoir of a device may for instance be regulable by one or more floats, vacuum systems, pump systems, or the like.

Water levels of water that may be present in optionally different water reservoirs of a single panel-shaped structure may for instance be regulable, for instance by means of capillarity, one or more floats, a vacuum system and/or a pump system.

Similarly, upon mutual coupling of different water reservoirs of different devices, water levels of water present in those different water reservoirs may for instance be regulable, for instance by means of capillarity, one or more floats, a vacuum system and/or a pump system.

Preferably, a water reservoir (i.e., storage space) of the device is substantially not, or entirely not, open or accessible from an outside of the panel-shaped structure. A possible access, for instance filling opening, to the reservoir is preferably closable, possibly hermetically closable. Means may be provided to prevent vacuum formation at the top inside the reservoir, for instance means in the form of an aerator.

Further, devices K may for instance be joined back to back or placed against each other, i.e., with rear sides facing each other. Thus a composite panel-shaped structure can be obtained, with an extra large (doubled) water capacity. Such a composite structure may furthermore be used in a series as mentioned, for instance stacked and/or juxtaposed, for instance to form a partition.

Furthermore, the device may be provided with indicator means, to indicate a filling level of the main water reservoir 4 and/or optionally bottom reservoir 6a. Such indicator means can comprise, for instance, a transparent wall or a transparent part of a wall of the device, such that the water level in the reservoir is visible from the surroundings, or may be designed otherwise. According to an extra advantageous elaboration, the indicator means can comprise a water level sensor, which may be configured to have an alert signal produced if the sensor detects that the water level in a reservoir as mentioned reaches or exceeds a threshold value. Such a sensor can comprise, for instance, an optical or electrical sensor, which will be clear to the skilled person. The sensor may be provided with or coupled to an alert device for the purpose of generating the alert signal. This signal can comprise, for instance, an acoustic signal and/or optical signal.

As mentioned, aeration means may be provided to aerate the main reservoir. The aeration means, according to a further elaboration, may be provided with an upstream air inlet, which may be located in a bottom reservoir as mentioned to receive air therefrom when the water level in the bottom reservoir reaches a threshold value. During an aeration (whereby air can flow via the upstream air inlet of the aeration means to the main reservoir), vacuum formation in the main reservoir can be undone so that water can flow from the reservoir to the substrate, for instance via a bottom reservoir, if present. The water can, in particular, continue to flow as long as the air inlet is still in communication with air, i.e., is not closed yet by a rising water level (in the bottom reservoir), and, obviously, if there is still water present in the main reservoir.

The invention claimed is:

1. A growth device for crop, comprising a panel-shaped structure, a substrate included in the panel-shaped structure for receiving crop, and at least one water reservoir included in the panel shaped structure, wherein the water reservoir extends substantially above a bottom side of the substrate in a vertical position of use of the growth device, the growth device further comprising connecting means to bring the water reservoir in communication with the substrate for moistening the substrate, wherein the connecting means comprise a bottom reservoir extending substantially under the substrate, and wherein the connecting means are further provided with a water flow regulator to regulate water flow from the water reservoir to the bottom reservoir extending substantially under the substrate,
wherein an underside of the substrate facing the bottom of the growth device is in direct contact with water present during use in the bottom reservoir, such that this water can be sucked up into the substrate.

2. The growth device according to claim 1, wherein the water suction means comprise one or more water suction cords or capillary means.

3. The growth device according to claim 1, wherein the water flow regulator is designed to work autonomously, without supply of electrical energy.

4. The growth device according to claim 3, wherein the water flow regulator is designed to work under the influence of gravity.

5. The growth device according to claim 1, wherein the water flow regulator comprises valve means.

6. The growth device according to claim 5, wherein the valve means comprises a regulating valve for closing off a water passage in a closed position and releasing it in a release position, while the position of the regulating valve is controllable under the influence of a float located in the bottom reservoir and coupled to the valve.

7. The growth device according to claim 6, wherein the float is coupled to the valve via an operating arm.

8. The growth device according to claim 1, wherein the panel-shaped structure is provided with a framework surrounding the substrate and the water reservoir.

9. The growth device according to claim 1, wherein the panel-shaped structure is provided with support means extending behind the substrate.

10. The growth device according to claim 1, wherein the substrate is of panel-shaped design.

11. The growth device according to claim 1, wherein a height of the water reservoir is at least equal to half a height of the substrate.

12. The growth device according to claim 1, wherein the water reservoir extends at least partly or partly above a top of the substrate in a vertical position of use of the growth device.

13. The growth device according to claim 1, wherein the substrate is designed as a cassette, wherein the cassette is removably included in a receiving opening in the panel shaped structure.

14. The growth device according to claim 13, wherein the cassette comprises a plant receiving part and a rear part, and wherein between the plant receiving part and the rear part, at least one capillary cloth is provided.

15. The growth device according to claim 1, wherein the substrate is provided with a number of mutually spaced apart openings for receiving crop.

16. The growth device according to claim 1, provided with an aerator to aerate the water reservoir.

17. The growth device according to claim 16, wherein the aerator is provided with an upstream air inlet.

18. The growth device according to claim 17, wherein the upstream air inlet is located in the bottom reservoir to receive air therefrom when the water level in the bottom reservoir reaches a threshold value.

19. The panel-shaped structure according to claim 1, wherein the panel-shaped structure is provided with a first cavity for receiving said substrate, and at least a second cavity for the water reservoir, and wherein said connecting means is included in said first cavity.

20. A growth device for crop, comprising a panel-shaped structure, a substrate included in the panel-shaped structure for receiving crop, and at least one water reservoir included in the panel shaped structure, wherein the water reservoir extends substantially above a bottom side of the substrate in a vertical position of use of the growth device, the growth device further comprising connecting means to bring the water reservoir in communication with the substrate for moistening the substrate, wherein the connecting means comprise a bottom reservoir extending substantially under the substrate, and wherein the connecting means are further provided with a water flow regulator to regulate water flow from the water reservoir to the bottom reservoir extending substantially under the substrate, and
wherein the substrate is provided with water suction means which reach from the substrate into the bottom reservoir to draw water therefrom.

21. The growth device according to claim 20, wherein an underside of the substrate facing the bottom of the growth device is in direct contact with water present during use in the bottom reservoir, such that this water can be sucked up into the substrate.

* * * * *